United States Patent
Kito et al.

(10) Patent No.: US 7,777,193 B2
(45) Date of Patent: Aug. 17, 2010

(54) RADIATION IMAGING APPARATUS

(75) Inventors: Eiichi Kito, Kanagawa-ken (JP);
Takuya Yoshimi, Kanagawa-ken (JP);
Tsuyoshi Tanabe, Kanagawa-ken (JP);
Yasunori Ohta, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/232,949

(22) Filed: Sep. 26, 2008

(65) Prior Publication Data

US 2009/0084962 A1    Apr. 2, 2009

(30) Foreign Application Priority Data

Sep. 28, 2007   (JP)   ............... 2007-253984

(51) Int. Cl.
*G01T 1/20* (2006.01)

(52) U.S. Cl. ................................. 250/370.09

(58) Field of Classification Search ............. 250/370.09
See application file for complete search history.

(56) References Cited

U.S. PATENT DOCUMENTS 6,268,614 B1   7/2001   Imai

2009/0087073 A1 *  4/2009  Kito et al. ................. 382/132

FOREIGN PATENT DOCUMENTS

| JP | 07-140255 | 6/1995 |
|---|---|---|
| JP | 2003-210444 | 7/2003 |
| JP | 3494683 B2 | 11/2003 |
| JP | 2005-296050 | 10/2005 |
| JP | 2006-247102 | 9/2006 |

* cited by examiner

*Primary Examiner*—Constantine Hannaher
(74) *Attorney, Agent, or Firm*—Jean C. Edwards, Esq.; Akerman Senterfitt

(57) ABSTRACT

The signal strength of communications of a cassette transmitter/receiver is set to be lower during transmission of confirmation image signals, that is, during readout of image signals from a radiation detector, than the signal strength of communications of the cassette transmitter/receiver at times other than during readout of image signals. This suppresses adverse influence imparted onto the image signals by wireless communication, and reduces the amount of noise generated in the image signals.

8 Claims, 5 Drawing Sheets

RADIATION IMAGING APPARATUS

CROSS-REFERENCE TO RELATED APPLICATIONS

The present application claims priority from Japanese Patent Application No. 2007-253984, filed Sep. 28, 2007, the contents of which are herein incorporated by reference in their entirety.

FIELD OF THE INVENTION

The present invention is related to a radiation imaging apparatus that reads out image signals from a radiation detecting section that detects radiation which has passed through a subject and outputs the image signals as wireless signals.

DESCRIPTION OF THE RELATED ART

Various radiation detectors that record radiation images of subjects when irradiated by radiation which has passed through the subjects have been proposed and are in practical use in the field of medicine and the like.

For example, there are radiation detectors that utilize semiconductors such as amorphous selenium that generate electrical charges when irradiated by radiation. Radiation detectors of this type that employ the so called optical readout method and the TFT readout method have been proposed.

Japanese Patent No. 3494683 discloses a radiation imaging system that employs the aforementioned radiation detector. In this system, radiation image signals which are detected by a radiation detector are wirelessly transmitted to a processing apparatus. Then, the processing apparatus administers signal processes, such as image processes, on the received radiation image signals.

Japanese Unexamined Patent Publication No. 2005-296050 discloses a radiation imaging system that generates confirmation image signals that represent a confirmation image having a lower resolution than a radiation image represented by radiation image signals. The confirmation image signals, which are a small volume of data, are transmitted to a processing apparatus. After the contents of the image which has been processed by the processing apparatus are confirmed and no problems are found therein, the radiation image signals, which are a large volume of data, are transmitted.

In this system, the generation of the confirmation image signals is sequentially performed during readout of the radiation image signals from a radiation detector, each time that a predetermined amount of image signals are read out. Therefore, the generation of the confirmation image signals and the readout of the radiation image signals can be performed in parallel simultaneously. Further, the confirmation image signals are transmitted to the processing apparatus as they are generated. Therefore, an operator can confirm the contents of processed images in short periods of time after imaging operations.

Radiation image signals are output as wireless signals in the inventions disclosed in Japanese Patent No. 3494683 and Japanese Unexamined Patent Publication No. 2005-296050. If radiation image signals which have already been read out are output as wireless signals during readout of new radiation image signals from radiation image detectors, noise will occur within the radiation image signals which are currently being read out, due to influence of the radio waves of the wireless transmission, resulting in deteriorated image quality of the radiation image. This is because the radiation image signals which are read out from the radiation image detector are extremely weak signals.

Therefore, Japanese Unexamined Patent Publication No. 2006-247102 discloses a radiation imaging system in which the operation of a communications module of an imaging apparatus that outputs wireless signals is ceased during readout of radiation image signals from a radiation detector.

Japanese Unexamined Patent Publication No. 2003-210444 discloses a radiation imaging system, in which a directional antenna is used to output wireless signals such that radio waves are not irradiated onto a radiation image detector and a detecting section that reads out radiation image signals from the radiation image detector, in order to suppress the aforementioned adverse influence imparted by the wireless signals.

In the radiation imaging system disclosed by Japanese Unexamined Patent Publication No. 2006-247102, wireless communication cannot be performed while reading out radiation image signals from the radiation detector. Consequently, the processing speed of the system becomes slow. In the radiation imaging system disclosed by Japanese Unexamined Patent Publication No. 2003-210444, limitations are imposed with regard to the placement of the transmitting side (electronic cassette) and the receiving side (console) of wireless communications, which results in a system with poor operability.

SUMMARY OF THE INVENTION

The present invention has been developed in view of the foregoing circumstances. It is an object of the present invention to provide a radiation imaging apparatus that generates confirmation image signals representing confirmation images having lower resolution than radiation images represented by radiation image signals obtained by imaging, which is capable of suppressing the adverse influence imparted by wireless signals onto radiation image signals, which are being read out, without sacrificing processing speed or being limited by antenna placement.

A first radiation imaging apparatus of the present invention comprises:

a radiation detecting section that generates electric charges when irradiated with radiation which has passed through a subject, to record a radiation image of the subject;

a readout section that reads out radiation image signals that represent the radiation image of the subject from the radiation detecting section;

a confirmation image signal generating section, for generating confirmation image signals that represent a confirmation image having a lower resolution than the radiation image represented by the radiation image signals; and a wireless communicating section that outputs the radiation image signals and the confirmation image signals as wireless signals;

the wireless communicating section decreasing the signal strength of communications during transmission of the confirmation image signals to be lower than the signal strength of communications during transmission of the radiation image signals.

A second radiation imaging apparatus of the present invention comprises:

a radiation detecting section that generates electric charges when irradiated with radiation which has passed through a subject, to record a radiation image of the subject;

a readout section that reads out radiation image signals that represent the radiation image of the subject from the radiation detecting section;

a confirmation image signal generating section, for generating confirmation image signals that represent a confirmation image having a lower resolution than the radiation image represented by the radiation image signals; and a wireless communicating section that outputs the radiation image signals and the confirmation image signals as wireless signals;

the wireless communicating section decreasing the transfer rate of communications during transmission of the confirmation image signals to be lower than the transfer rate of communications during transmission of the radiation image signals.

In the first and second radiation imaging apparatuses of the present invention, a configuration may be adopted, wherein:

the confirmation image signal generating section generates confirmation image signals for only a portion of radiation image signals, in the case that a plurality of continuous imaging operations are performed.

Here, the term "plurality of continuous imaging operations" refers to cases in which video imaging is performed, or cases in which imaging operations are repeated with comparatively short intervals therebetween.

In cases that the contents of images represented by radiation image signals which are obtained by a plurality of imaging operations are similar, or in cases that temporal changes of a single subject are represented by a sequence of images, the contents of the images can be understood without generating confirmation image signals for all of the images. By adopting the above configuration, the processing time of the radiation imaging apparatus can be reduced.

In addition, a configuration may be adopted, wherein:

in the case that a new imaging operation is initiated during transmission of the radiation image signals, the wireless communicating section ceases transmission of the radiation image signals until the new imaging operation is completed.

According to the first radiation imaging apparatus of the present invention, the confirmation image signal generating section, generates confirmation image signals that represent a confirmation image having a lower resolution than the radiation image represented by the radiation image signals obtained by imaging; and the wireless communicating section outputs the confirmation image signals prior to the radiation image signals as wireless signals first. The wireless communicating section decreases the signal strength of communications during transmission of the confirmation image signals to be lower than the signal strength of communications during transmission of the radiation image signals. Therefore, the influence exerted onto the image signals, which are being read out, by the wireless signals output from the wireless communicating section can be reduced. Accordingly, the amount of noise that occurs in the image signals can also be reduced.

According to the second radiation imaging apparatus of the present invention, the confirmation image signal generating section, generates confirmation image signals that represent a confirmation image having a lower resolution than the radiation image represented by the radiation image signals obtained by imaging; and the wireless communicating section outputs the confirmation image signals prior to the radiation image signals as wireless signals first. The wireless communicating section decreases the transfer rate of communications during transmission of the confirmation image signals to be lower than the transfer rate of communications during transmission of the radiation image signals. Therefore, the influence exerted onto the image signals, which are being read out, by the wireless signals output from the wireless communicating section can be reduced. Accordingly, the amount of noise that occurs in the image signals can also be reduced.

In cases that the contents of images represented by radiation image signals which are obtained by a plurality of imaging operations are similar, or in cases that temporal changes of a single subject are represented by a sequence of images, the contents of the images can be understood without generating confirmation image signals for all of the images. Therefore, the first and second radiation imaging apparatuses of the present invention may adopt a configuration, wherein: the confirmation image signal generating section generates confirmation image signals for only a portion of radiation image signals, in the case that a plurality of continuous imaging operations are performed. Thereby, the processing time of the radiation imaging apparatus can be reduced.

A configuration may be adopted, wherein: in the case that a new imaging operation is initiated during transmission of the radiation image signals, the wireless communicating section ceases transmission of the radiation image signals until the new imaging operation is completed. In this case, transmission of confirmation image signals representing a confirmation image of the newly obtained radiation image can be prioritized. Accordingly, the wait time between imaging operations and confirmation of images can be reduced.

BEST MODE FOR CARRYING OUT THE INVENTION

Hereinafter, a radiation imaging system 10 that employs a radiation imaging apparatus according to a first embodiment of the present invention will be described.

Figure 1:
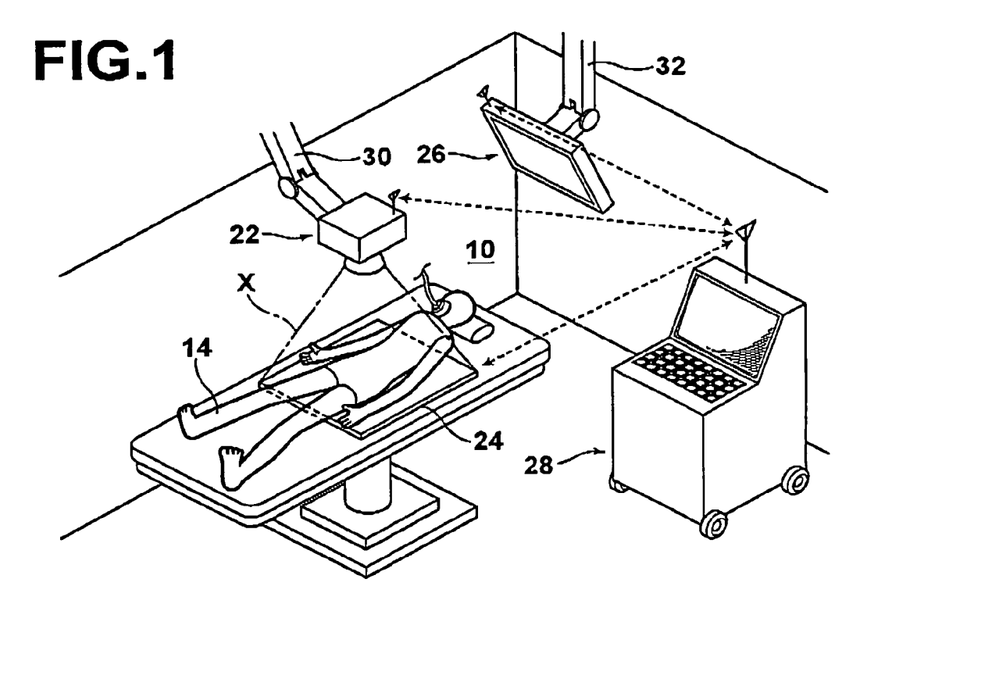
FIG. 1 is a schematic diagram that illustrates radiation imaging systems that employ radiation imaging apparatus according to first and second embodiments of the present invention.

FIG. 1 is a diagram that illustrates an operating room in which the radiation imaging system 10 is installed.

The radiation imaging system 10 is equipped with: an imaging apparatus 22; a radiation detecting cassette 24; a display apparatus 26; and a console 28. The imaging apparatus 22 irradiates patients 14 with radiation X of a dosage according to imaging conditions. The radiation detecting cassette 24 includes a radiation detector that detects the radiation X which has passed through the patients 22 and records radiation images of the patients 22. The display apparatus 26 displays the radiation images detected by the radiation detector. The console 28 controls the operations of the imaging apparatus 22, the radiation detecting cassette 24, and the display apparatus 26. Signals are transmitted and received among the console 22, the imaging apparatus 22, the radiation detecting cassette 24 and the display apparatus 26 by wireless communications.

The imaging apparatus 22 is connected to a movable arm 30, to be movable to desired positions according to the portion of a patient 14 to be imaged, as well as to standby positions out of the way of physicians. Similarly, the display apparatus 26 is connected to a movable arm 32, to be movable to positions at which physicians can easily observe obtained radiation images.

Figure 2:
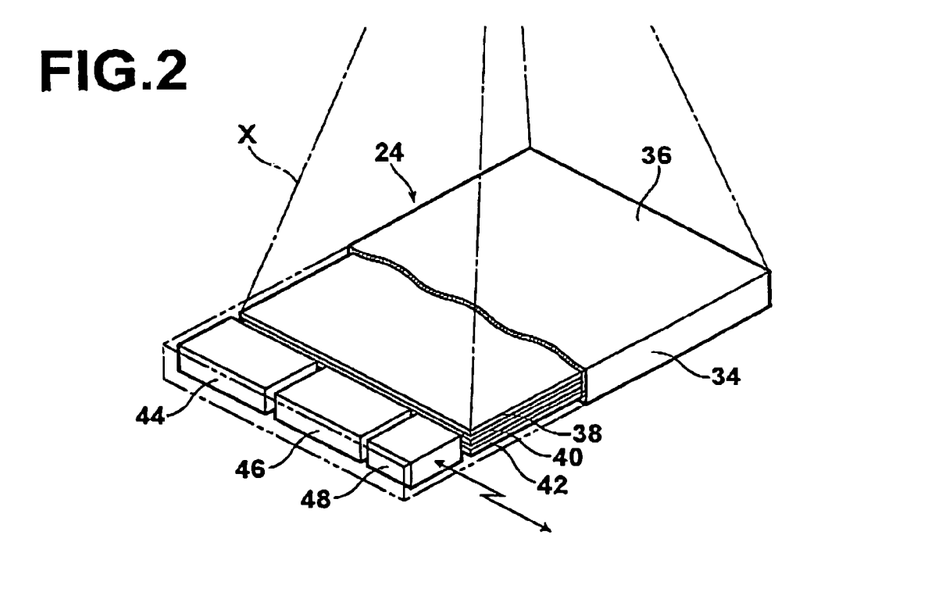
FIG. 2 is a diagram that illustrates the interior structure of a radiation detecting cassette.

FIG. 2 is a diagram that illustrates the interior structure of the radiation detecting cassette 24. The radiation detecting cassette 24 is equipped with a casing 34 which is transmissive with respect to the radiation X. A grid 38, for removing rays of the radiation X scattered by the patient 14; a radiation detector 40, for detecting the radiation X which has passed through the patient 14 and for recording a radiation image of the patient 14; and a lead plate 42, for absorbing backscattered radiation X, are provided within the casing 34 in this order from the surface 36 of the casing 34 onto which the radiation X is irradiated. Note that the surface 36 of the casing 34 onto which the radiation X is irradiated may be configured to be the grid 38.

Figure 4:
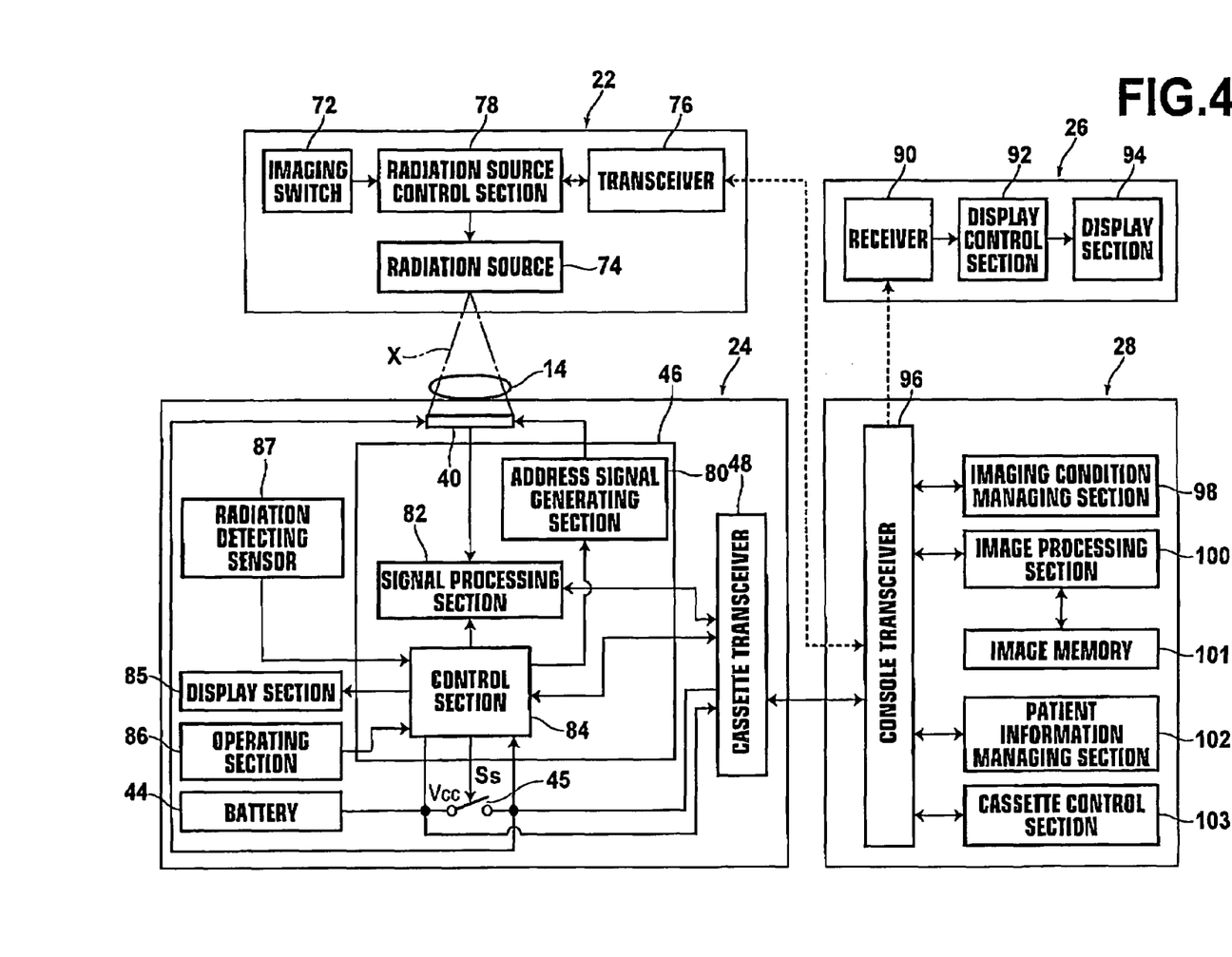
FIG. 4 is a schematic block diagram of the radiation imaging system.

A battery 44, which is the power source of the radiation detecting cassette 24; a cassette control section 46, for driving and controlling the radiation detector 40 by power supplied from the battery 44; and a cassette transceiver 48, for transmitting radiation image signals read out from the radiation detector 40 and the like to the console 28 as wireless signals, and for receiving control signals and the like from the console 28, are also housed within the casing 34. Note that it is preferable for lead plates to be provided on the cassette control section 46 and the cassette transceiver 48 toward the sides thereof that face the surface 36 of the casing 34 onto which the radiation X is irradiated, in order to avoid damage due to irradiation by the radiation X. Although omitted from FIG. 2, a display section 85 and an operating section 86 are also provided on the radiation detecting cassette 24, as illustrated in FIG. 4. The display section 85 displays radiation images detected by the radiation detector 40 and the like. The operating section 86 is provided to enable input of operating signals to the radiation detecting cassette 24. Further, a radiation detecting sensor 87, for detecting the irradiated radiation X is provided. A control section 84 generates control signals for automatic exposure based on the signal detected by the radiation detecting sensor 87, and transmits the control signals to the console 28 via the cassette transceiver 48.

Figure 3:
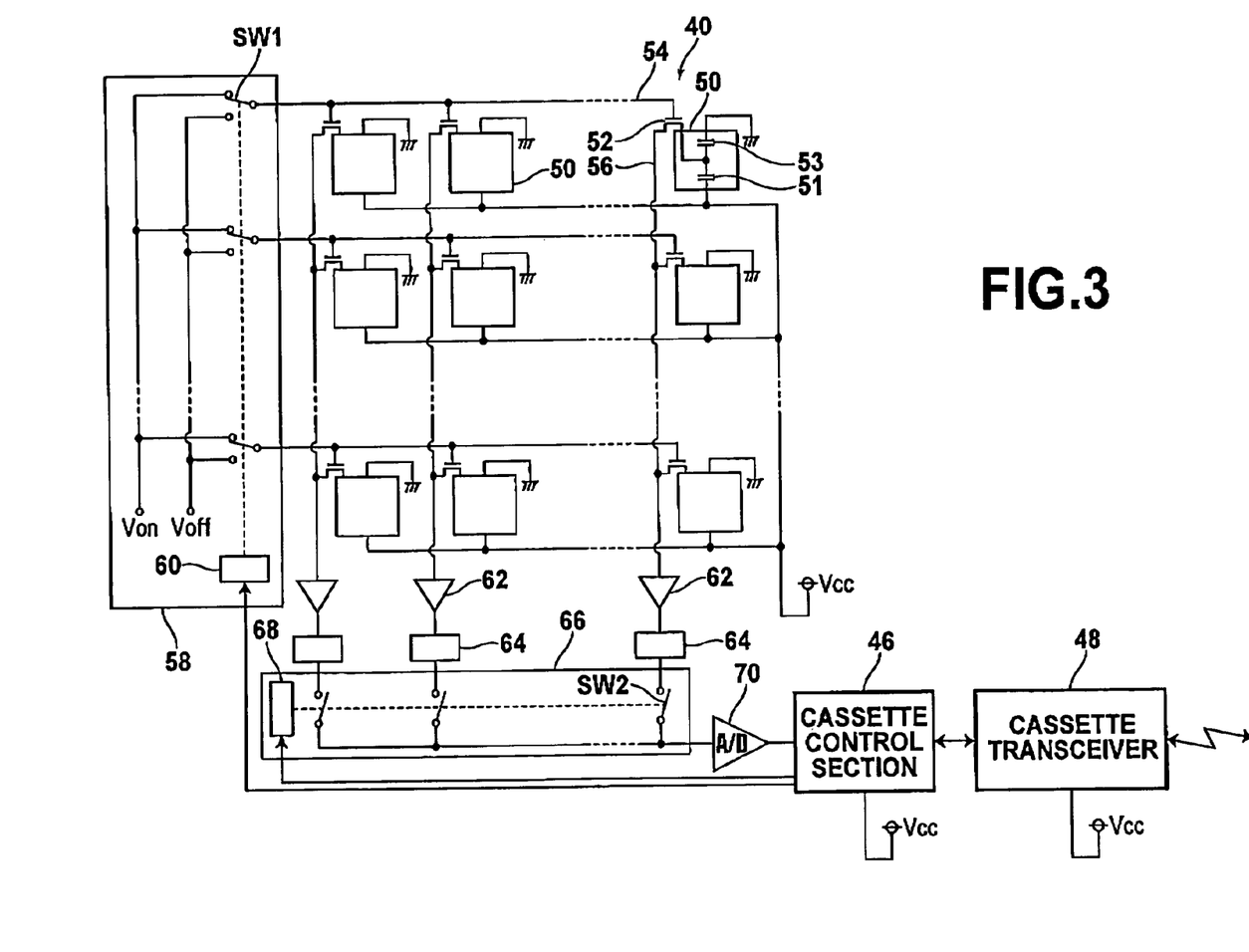
FIG. 3 is a block diagram that illustrates the circuit structure of a radiation detector.

FIG. 3 is a block diagram that illustrates the circuit structure of the radiation detector 40. The radiation detector 40 is of a structure in which a photoelectric converting layer 51 formed by a substance that senses the radiation X and generates electric charges, such as amorphous selenium (a-Se) is provided on a TFT (Thin Film Transistor) array, in which TFT's 52 are provided in an array. The electric charges which are generated in the photoelectric converting layer 51 are accumulated in a charge accumulating capacitor 53. Then, each row of TFT's 52 are sequentially turned ON, to read out the electric charges accumulated in the charge accumulating capacitor 53 as image signals. In FIG. 3, the connective relationship between a single pixel 50 and a single TFT 52 is shown, and the structures that constitute other pixels 50 are omitted. Note that the structure of amorphous selenium changes at high temperatures, and the function thereof deteriorates. Therefore, it is necessary to use the photoelectric converting layer 51 within a predetermined temperature range. Accordingly, it is preferable for a cooling means for cooling the radiation detector 40 to be provided within the radiation detecting cassette 24.

A gate line 54 that extends parallel to the row direction of the TFT's 52 and a signal line 50 that extends parallel to the column direction of the TFT's 52 is connected to each TFT 52 which is connected to each pixel 50 of the radiation detector 40. Each gate line 54 is connected to a line scanning drive section 58, and each signal line 56 is connected to a multiplexer 66.

Control signals Von and Voff, for controlling the TFT's 52 arranged in the row direction to be turned ON and OFF, are supplied to the gate lines 54 from the line scanning drive section 58. In this case, the line scanning drive section 58 is equipped with a plurality of switches SW1, for switching among the gate lines 54, and an address decoder 60 for outputting a selection signal that selects one of the switches SW1. Address signals are supplied to the address decoder 60 from the cassette control section 46.

Electric charges which are held in the charge accumulating capacitors 53 for each pixel 50 flow to the signal lines 56, via the TFT's 52, which are arranged in the column direction. These electric charges are amplified by amplifiers 62. The multiplexer 66 is connected to the amplifiers 62 via sample holding circuits 64. The multiplexer 66 is equipped with a plurality of switches SW2, for switching among the signal lines 56, and an address decoder 68 for outputting a selection signal that selects one of the switches SW2. Address signals are supplied to the address decoder 68 from the cassette control section 46. An A/D converter 70 is connected to the multiplexer 66, and radiation image signals, which are converted to digital signals by the A/D converter, are output to the cassette control section 46.

FIG. 4 is a schematic block diagram of the radiation imaging system 10, constituted by the imaging apparatus 22, the radiation detecting cassette 24, the display apparatus 26 and the console 28.

The imaging apparatus 22 is equipped with: an imaging switch 72; a radiation source 74 that outputs the radiation X; a transceiver 76 that receives imaging conditions from the console 28 by wireless communications, and transmits imaging completion signals and the like to the console 28 by wireless communications; and a radiation source control section 78 that controls the radiation source 74, based on imaging start signals supplied by the imaging switch 72 and imaging conditions supplied by the transceiver 76. Note that in cases that automatic exposure control is performed based on signals detected by the radiation detecting sensor 87 of the radiation detecting cassette 24, the control signal generated based on the signals detected by the radiation detecting sensor 87 is output from the cassette control section 46 to the console 28 via the cassette transceiver 48. Then, the console 28 outputs a control signal to the imaging apparatus 22. The control signal is input to the radiation source control section 78 via the transceiver 76. Finally, the radiation source control section 78 ceases emission of radiation from the radiation source 74.

The radiation detector 40, the battery 44, the cassette control section 46, the cassette transceiver 48, and a power switch 45 are housed in the radiation detecting cassette 24. The power switch 45 is turned ON and OFF by control signals Ss output from the control section 84, to switch the supply of power from the battery 44 to the radiation detector 40, the cassette control section 46, and the cassette transceiver 48 ON and OFF. The control section 84 outputs the control signals Ss to the power switch 45, based on control signals input thereto from the console 28 via the cassette transceiver 48.

The cassette control section 46 is equipped with an address signal generating section 80 that supplies the address decoder 60 of the line scanning drive section 58 of the radiation detector 40 and the address decoder 68 of the multiplexer 66 with address signals; an image memory 82 for storing the radiation image signals which are read out from the radiation detector 40; a signal processing section that records the radiation image signals read out from the radiation detector 40; and the control section 84 that controls the operations of the address signal generating section 80, the image memory 82, and the cassette transceiver 48.

Figure 5:
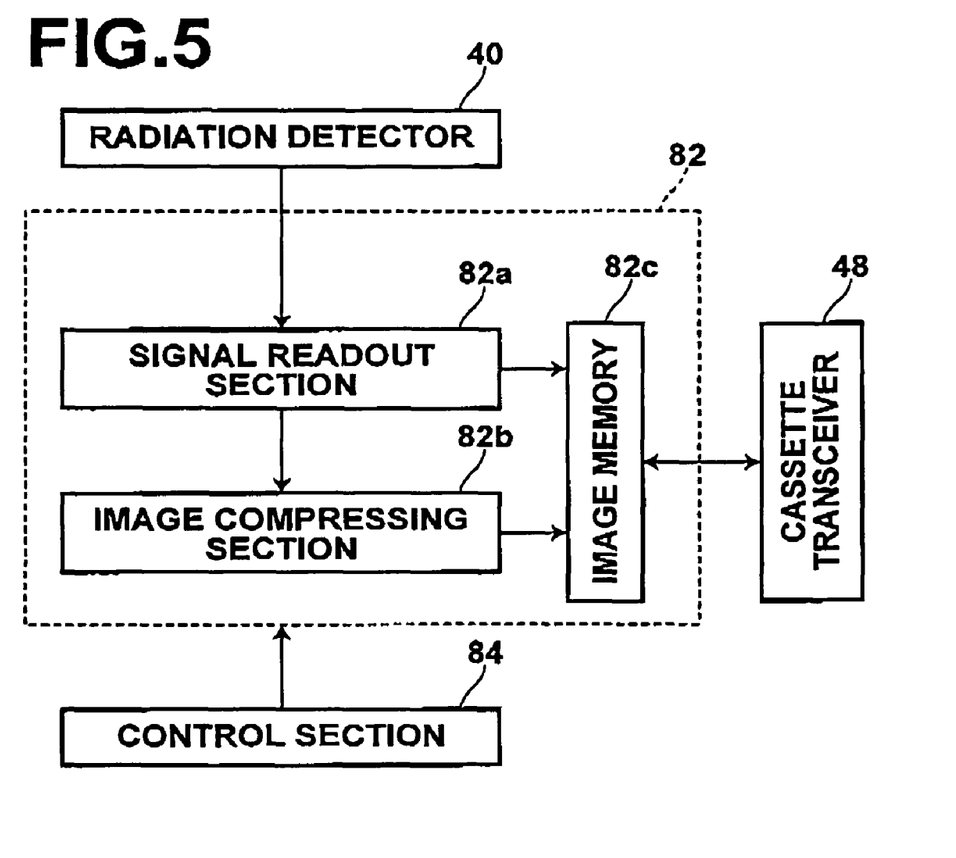
FIG. 5 is a block diagram that illustrates a signal processing section of the radiation detecting cassette.

FIG. 5 is a block diagram that illustrates the structure of the signal processing section 82 of the radiation detecting cassette 24.

The signal processing section 82 is constituted by: a signal readout section 82a, for reading radiation image signals out from the radiation detector 40; an image compressing section 82b, for generating confirmation image signals that represent confirmation images having lower resolutions than the radiation images represented by the radiation image signals; and an image memory 82c, for temporarily storing the radiation image signals and the confirmation image signals.

The signal readout section 82a is constituted by the aforementioned amplifier 62, the sample holding circuit 64, the multiplexer 66, and the A/D converter 70.

The image compressing section 82b thins out pixel data represented by the radiation images at predetermined intervals, to generate the confirmation image signals that represent confirmation images having lower resolutions than the radiation image signals. Here, the confirmation image signals are sequentially generated during readout of the radiation image signals from the radiation detector 40 each time that a predetermined amount of radiation image signals are read out The generated confirmation image signals are sequentially transmitted from the radiation detector 40 to the console 28. That is, the generation of the confirmation image signals and the readout of the radiation image signals can be performed in parallel simultaneously. Thereby, an operator can confirm the contents of images in short periods of time after imaging operations.

The control section 84 outputs signals indicating that confirmation image signals are being transmitted to the cassette transceiver 48, as will be described later. The signals output from the control section 84 are not limited to those that indicate that confirmation image signals are being transmitted. Various types of information regarding the radiation detecting cassette 24, such as the operating state of the radiation detector 40, are output to the console 28 via the cassette transceiver 48. For example, a temperature sensor may be provided in the radiation detecting cassette 24, and information regarding the temperature may be output to the console 28 via the cassette transceiver 48. In addition, the control section 84 receives various control signals issued to the radiation detecting cassette 24 from the console 28 via the cassette transceiver 48, in addition to the control signals Ss for turning the power switch 45 ON and OFF.

The display apparatus 26 is equipped with: a receiver 90 that receives radiation image signals from the console 28; a display control section 92 that controls the display of the received radiation image signals; and a display section 94 that displays radiation images based on the radiation image signals which have been processed by the display control section 92.

The console 28 is equipped with a console transceiver 96 that transmits and receives necessary information, including radiation image signals, to and from the imaging apparatus 22, the radiation detecting cassette 24, and the display apparatus 26 as wireless signals; an imaging condition managing section 98 that manages imaging conditions which are necessary for the imaging apparatus 22 to perform imaging operations; an image processing section 100 that administers image processes on radiation image signals transmitted from the radiation detecting cassette 24; an image memory 101 that records radiation image signals on which image processes have been administered; a patient information managing section 102 that manages information regarding patients 14 who are the subjects of imaging; and a cassette control section 103 that outputs various control signals to the radiation detecting cassette 24, such as the control signals for turning the power switch 45 ON, and receives various types of information regarding the radiation detecting cassette 24, such as the operating state of the radiation detecting cassette 24.

Note that the term "imaging conditions" refers to conditions that determine X-ray tube voltage, X-ray tube current, irradiation time, and the like, such that the radiation X is irradiated at appropriate dosages onto imaged portions of the patients. For example, the "imaging conditions" may be conditions such as "portion to be imaged" and "imaging method". The term "patient information" refers to information that specifies each patient 14, such as the name, the sex, and the patient ID number of the patients 14. Imaging ordering information that includes the imaging conditions and the patient information can be set at the console 28.

Figure 6:
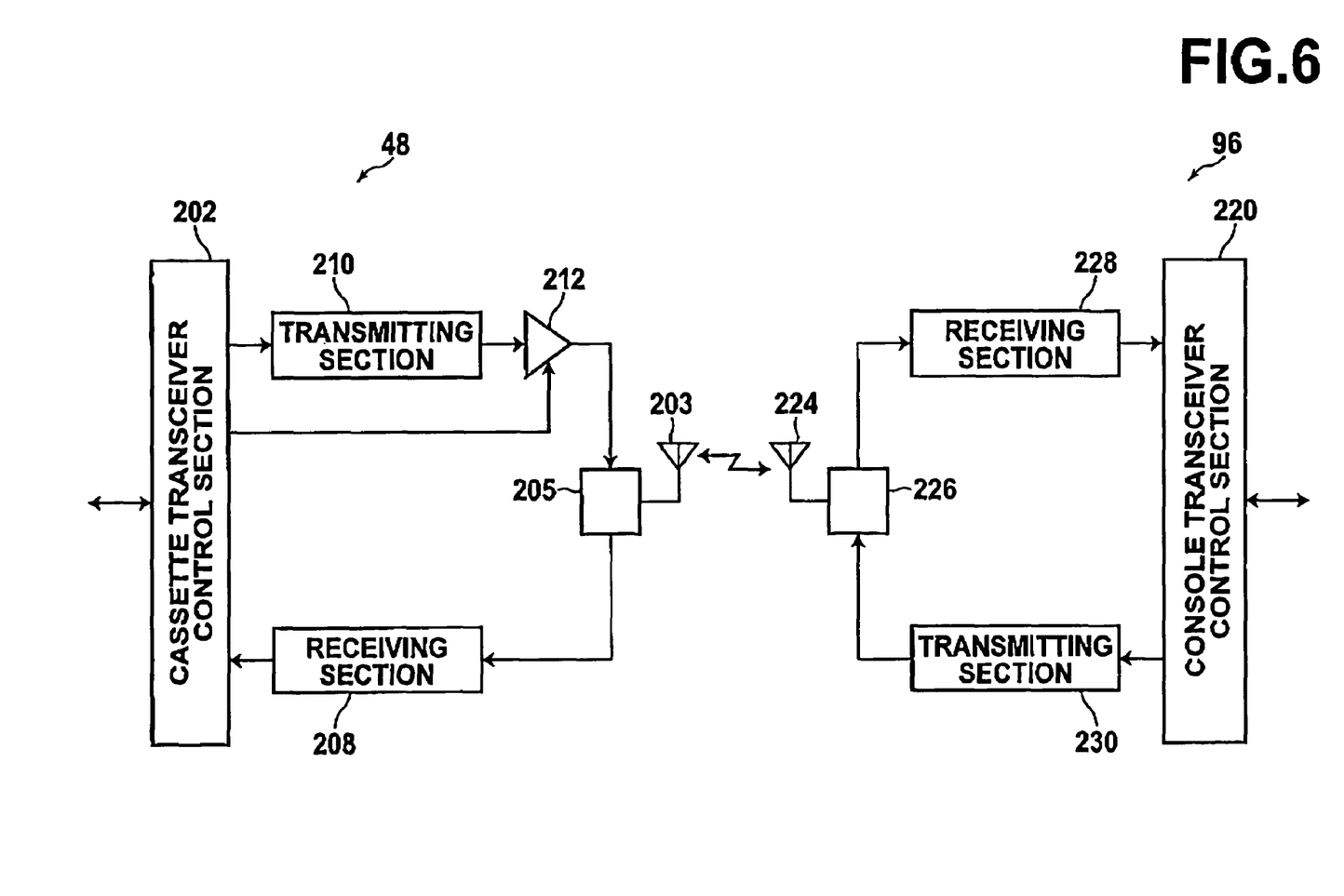
FIG. 6 is a block diagram that illustrates a portion of the inner structures of a cassette transceiver of a radiation detecting cassette and a console transceiver of a console.

FIG. 6 is a block diagram that illustrates the inner structures of the cassette transceiver 48 of the radiation detecting cassette 24 and the console transceiver 96 of the console 28.

The cassette transceiver 48 of the radiation detecting cassette 24 is equipped with: a cassette transceiver control section 202 including a microcomputer; an antenna 203; an antenna duplexer 205; a receiving section 208; a transmitting section 210; and a variable gain amplifier 212.

The receiving section 208 demodulates radio waves which are received by the antenna 203 and input to the receiving section 208 via the antenna duplexer 205. The demodulated radio waves are output to the cassette transceiver control section 202 as received signals. The transmitting section 210 modulates and outputs radiation image signals, which are read out from the image memory 82 (refer to FIG. 4) and output from the cassette transceiver control section 202 at a predetermined transfer rate.

The variable gain amplifier 212 amplifies the signals output from the transmitting section 210 at a set gain, and outputs transmission signals. The gain level of the variable gain amplifier 212 is switched according to control signals output from the cassette 35 transceiver control section 202.

The cassette transceiver control section 202 sets the gain to be lower during transmission of the confirmation image signals, as indicated by signals from the control section 84 (refer to FIG. 4), than the gain at times other than during readout of image signals. Thereby, the signal strength of communications of the cassette transceiver 48 is set to be lower during transmission of the confirmation image signals than during times other than transmission of the confirmation image signals.

Note that the gain level of the variable gain amplifier 212 during transmission of the confirmation image signals is set to a value at which the wireless signals output from the cassette transceiver 48 do not influence the radiation image signals which are being read out. This gain level may be obtained in advance, and set at the cassette transceiver control section 202.

Meanwhile, the console transceiver 96 is equipped with: a console transceiver control section 220 including a microcomputer; an antenna 224; an antenna duplexer 226; a receiving section 228; and a transmitting section 230.

The receiving section 228 demodulates radio waves which are received by the antenna 224 and input to the receiving section 228 via the antenna duplexer 226. The demodulated radio waves are output to the console transceiver control section 96 as received signals. The transmitting section 230 modulates and outputs radiation image signals, which are output from the console transceiver control section 96.

Next, the operation of the radiation imaging system 10 that employs the first embodiment will be described.

The radiation imaging system 10 is installed in an operating room 12, and used by a physician when radiation imaging of a patient becomes necessary during surgery, for example. For this reason, the patient information of the patient 14 who is the subject of imaging is registered in the patient information managing section 102 of the console 28 in advance, prior to imaging operations being performed. In addition, in the case that portions to be imaged and imaging methods are also set in advance, these imaging conditions are registered in the imaging condition managing section 98 in advance. Surgery on the patient 14 is initiated in a state in which the preparatory steps described above have been completed.

In the case that radiation imaging is to be performed during surgery, the physician or a radiological technician sets the radiation detecting cassette 24 at a predetermined position between the patient 14 and an operating table 16 such that the surface 36 onto which radiation is irradiated faces the imaging apparatus 22.

Next, the physician or the radiological technician operates the console 28 to output a control signal from the cassette control section 103 to turn the power switch 45 of the radiation detecting cassette 24 ON. The control signal is output from the console 28 via the console transceiver 96. The control signal is received by the cassette transceiver 48 of the radiation detecting cassette 24, and output to the control section 84. The control section 84 outputs a control signal to the power switch 45 to turn the power switch 45 ON. When the power switch 24 of the radiation detecting cassette 24 is turned ON, various types of information, such as the operating state of the radiation detecting cassette 24, are output from the control section 84 of the cassette control section 46. The information is output to the console 28 via the cassette transceiver 48.

Here, the signals that represent the various types of information regarding the radiation detecting cassette 24 are output from the cassette transceiver control section 202 of the cassette transceiver 48 to the transmitting section 210 at a predetermined transfer rate. The signals are modulated at the transmitting section 210, amplified by the variable gain amplifier 212, then output to the console 28 via the antenna duplexer 205 and the antenna 203. At this time, the cassette transceiver control section 202 is not receiving a signal from the control section 84 that indicates that confirmation image signals are being transmitted. Therefore, the gain level of the variable gain amplifier 212 is set at a level which is higher than that which is set during transmission of confirmation image signals, that is, a gain level which is used during standard wireless communications. As described above, the cassette transceiver control section 202 sets the gain level of the variable gain amplifier 212 at a higher level than the gain set during transmission of confirmation image signals, while signals indicating that confirmation image signals are being transmitted are not being received from the control section 84.

Next, the imaging apparatus 22 is moved to a position that faces the radiation detecting cassette 24 and the imaging switch 72 is operated to perform an imaging operation.

The radiation source control section 78 of the imaging apparatus 22 obtains imaging conditions for the portion of the patient 14 to be imaged from the image condition managing section 98 of the console 28, via the console transceiver 96 and the transceiver 76. The radiation source 74 is controlled according to the obtained imaging conditions, to irradiate radiation X of a predetermined dosage onto the patient 14.

The radiation X which has passed through the patient 14 is irradiated onto the radiation detector 40 after scattered rays are removed by the grid 38 of the radiation detecting cassette 24. The photoelectric converting layer 51 that constitutes the radiation detector 40 converts the radiation X into electric signals, and the charge accumulating capacitors 53 corresponding to each pixel 50 holds the electric signals as electric charges (refer to FIG. 3).

Here, the radiation X which is irradiated toward the radiation detecting cassette 24 is detected by the radiation detecting sensor 87 provided in the radiation detecting cassette 24 as well as by the radiation detector 40. In the case that automatic exposure control is performed based on signals detected by the radiation detecting sensor 87 of the radiation detecting cassette 24, an automatic exposure control signal generated based on the signals detected by the radiation detecting sensor 87 is output from the control section 84 of the cassette control section 46 to the console 28 via the cassette transceiver 48. At this time as well, the cassette transceiver control section 202 is not receiving a signal from the control section 84 that indicates that confirmation image signals are being transmitted. Therefore, the gain level of the variable gain amplifier 212 is set at a level which is higher than that which is set during transmission of confirmation image signals, that is, a gain level which is used during standard wireless communications.

A control signal is output from the console 28 to the imaging apparatus 22 in response to the automatic exposure control signal transmitted to the console 28 from the radiation detecting cassette 24. The control signal is input to the radiation source control section 78 via the transceiver 76. The radiation source control section 78 ceases emission of radiation from the radiation source 74, based on the control signal.

After irradiation of the radiation X is ceased as described above, the electric charges which are held in each of the charge accumulating capacitors 53 of the radiation detector 40 are read out according to address signals which are output from the address signal generating section 80 of the cassette control section 46 to the line scanning drive section 58 and the multiplexer 66.

That is, the address decoder 60 of the line scanning drive section 58 outputs a selection signal according to an address signal supplied thereto the address signal generating section 80, to select one of the switches SW1. When the switch SW1 is selected, the control signal Von is supplied to the gate of the TFT 52 connected to the gate line corresponding to the switch SW1. Meanwhile, the address decoder 68 of the multiplexer 66 outputs selection signals according to the address signals supplied thereto by the address signal generating section 80 to sequentially select the switches SW2. Thereby, the electric charge signals which are held in the charge accumulating capacitors 53 corresponding to each pixel 50 connected to the gate line 54 which has been selected by the line scanning drive section 58 are sequentially read out via the signal lines 56.

The electric charge signals, which have been read out from the charge accumulating capacitors 53 corresponding to each pixel 50 connected to the selected gate line 54 of the radiation detector, are amplified by the amplifiers 62 connected to each of the signal lines 56. The amplified signals are sampled by each of the sample holding circuits 64 connected to the amplifiers 62, then supplied to the A/D converter 70 via the multiplexer 66, where they are converted to digital signals. The radiation image signals which have been converted to digital signals are temporarily recorded in the image memory 82 of the cassette control section 46.

The image compressing section 82b sequentially generates confirmation image signals each time that a predetermined amount of image signals are read out, and stores the generated confirmation image signals in the image memory 82c.

The address decoder 60 of the line scanning drive section 58 sequentially switches the switch SW1 which is selected according to the address signals supplied thereto by the address signal generating section 80. Thereby, the electric charge signals, which are held in the charge accumulating capacitors 53 corresponding to each pixel 50 connected to the gate line 54 selected by the line scanning drive section 58, are sequentially read out.

The control section 84 of the cassette control section 46 sequentially reads out units of confirmation image signals necessary for transmission from the image memory 82c prior to confirmation image signals corresponding to a single frame being recorded in the image memory 82c. The read out units of confirmation image signals are output to the cassette transceiver 48.

The cassette transceiver control section 202 outputs the units of confirmation image signals to the transmitting section 210 at a predetermined transfer rate. Then, the confirmation image signals are modulated by the transmitting section 210, amplified by the variable gain amplifier 212, then transmitted to the console 28 as wireless signals via the antenna duplexer 205 and the antenna 203.

Here, when confirmation image signals are being transmitted as described above, a signal indicating that confirmation image signals are being transmitted is output from the control section 84 of the cassette control section 46. This signal is input to the cassette transceiver control section 202 of the cassette transceiver 48. The cassette transceiver control section 202 outputs a control signal to the variable gain amplifier 212 according to the signal, and lowers the gain level of the variable gain amplifier 212 to a preset gain level.

Note that the preset gain level of the variable gain amplifier 212 which is set during transmission of the confirmation image signals is that at which the wireless signals output from the cassette transceiver 48 do not influence the radiation image signals which are being read out, as described previously.

After transmission of the confirmation image signals is completed, the signal that indicates that transmission is being performed is no longer output from the control section 84 of the cassette control section 46. At this time, the cassette transceiver control section 202 outputs a control signal to the variable gain amplifier 212 to increase the gain level to that which is used during standard wireless communications.

The modulated signals transmitted to the console 28 are demodulated by the console transceiver 96 as confirmation image signals. Predetermined image processes are administered to the demodulated confirmation image signals by the image processing section 100, then the processed image signals are correlated with the patient information registered in the patient information managing section 102, and recorded in the image memory 101.

Thereafter, the confirmation image signals, which have undergone the image processes, are transmitted from the console transceiver 96 to the display apparatus 26. The display apparatus 26, which has received the confirmation image signals through the receiver 90, controls the display section 94 with the display control section 92, and displays a confirmation image on the display section 94.

The physician or radiological technician confirms whether the imaging operation has been properly performed, by viewing the confirmation image which is displayed by the display section. In the case that it is confirmed that the imaging operation has been properly performed, commands that prompt transmission of the radiation image, which is a larger data file, from the radiation detecting cassette 24 to the console 28 are input via the console 28.

When the command is received, cassette control section 103 of the console 28 outputs a control signal that prompts transmission of the radiation image to the radiation detecting cassette 24. The control signal is output from the console 28 via the console transceiver 96. The control signal is received by the cassette transceiver 48 of the radiation detecting cassette 24, and output to the control section 84. The control section 84 performs processes similar to those for transmitting the confirmation image signals, to transmit the radiation image signals.

At this time, the cassette transceiver control section 202 of the cassette transceiver 48 is not receiving the signal from the control section 84 that indicates that confirmation image signals are being transmitted. Therefore, the gain level of the variable gain amplifier 212 is set to be higher than the gain level which is used during readout of radiation image signals, that is, a gain level which is used for standard wireless communications.

The radiation image signals which are transmitted from the radiation detecting cassette 24 are transmitted to the display apparatus 26 via the console in the same manner as that for the confirmation image signals. The display section 94 displays the radiation image.

In the radiation imaging system that employs the radiation imaging apparatus according to the first embodiment of the present invention, the cassette transceiver 48 decreases the signal strength of communications during transmission of confirmation image signals, that is, during readout of the radiation image signals from the radiation detector 40, to be lower than the signal strength of communications at times other than during readout of the radiation image signals. Therefore, the influence exerted onto the radiation image signals, which are being read out, by the wireless signals output from the cassette transceiver 48 can be reduced. Accordingly, the amount of noise that occurs in the radiation image signals can also be reduced.

Next, a radiation imaging system that employs a radiation imaging apparatus according to a second embodiment of the present invention will be described.

The radiation imaging system that employs the second embodiment is of substantially the same configuration as the radiation imaging system that employs the first embodiment described above. However, the radiation imaging system that employs the second embodiment differs from that which employs the first embodiment in that the signal strength of the cassette transceiver 48, that is, the gain level of the variable gain amplifier 212, is not decreased during transmission of confirmation image signals. Instead, the gain level of the variable gain amplifier 212 is kept constant, and the transfer rate of the signals output from the cassette transceiver control section 202 of the cassette transceiver is varied.

Specifically, a signal indicating that confirmation image signals are being transmitted is output from the control section 84 of the cassette control section 46. This signal is input to the cassette transceiver control section 202 of the cassette transceiver 48. In response to this signal, the cassette transceiver control section 202 decreases the transfer rate at which confirmation image signals are transferred to the transmitting section 210 to a preset speed. Note that the transfer rate during readout of radiation image signals from the radiation detector 40 is set such that wireless signals output from the cassette transceiver 48 do not adversely influence the radiation image signals which are being read out.

After the signal that indicates that confirmation image signals are being transmitted is no longer output from the control section 84 of the cassette control section 46, the cassette transceiver control section 202 increases the transfer rate from the cassette transceiver control section 202 to the transmitting section 210 to a transfer rate which is used during standard wireless communications.

According to the radiation imaging system that employs the second embodiment, the transfer rate of the cassette transceiver control section 202 is set to be lower during transmission of confirmation image signals, that is, during readout of radiation image signals from the radiation detector 40, than the transfer rate at times other than during readout of the radiation signals. Therefore, the influence exerted onto the image signals, which are being read out, by the wireless signals output from the cassette transceiver 48 can be reduced. Accordingly, the amount of noise that occurs in the image signals can also be reduced.

The radiation detector 40 which is housed in the radiation detecting cassette 24 of the radiation imaging systems of the first and second embodiments are those that directly convert the radiation X irradiated thereon to electric signals with the photoelectric converting layer 51. However, the present invention is not limited to using radiation detectors of this type. The radiation detector may be of the indirect conversion type. An example of such a radiation detector is that which converts radiation X irradiated thereon to visible light with a scintillator, then converts the visible light to electric signals using a-Si (amorphous silicon) or the like (refer to Japanese Patent No. 3494683).

In addition, the radiation detector 40 is a TFT readout type radiation detector, that reads out electric charge signals using TFT's. However, the present invention is not limited to using radiation detectors of this type. The radiation detector may be of the optical readout type, that reads out accumulated electric charge signals by having readout light irradiated thereon (refer to U.S. Pat. No. 6,268,614).

What is claimed is:

1. A radiation imaging apparatus, comprising:
   a radiation detecting section that generates electric charges when irradiated with radiation which has passed through a subject, to record a radiation image of the subject;
   a readout section that reads out radiation image signals that represent the radiation image of the subject from the radiation detecting section;
   a confirmation image signal generating section, for generating confirmation image signals that represent a confirmation image having a lower resolution than the radiation image represented by the radiation image signals; and
   a wireless communicating section that outputs the radiation image signals and the confirmation image signals as wireless signals;
   the wireless communicating section decreasing the signal strength of communications, without completely ceasing communications, during transmission of the confirmation image signals to be lower than the signal strength of communications during transmission of the radiation image signals.

2. A radiation imaging apparatus, comprising:
   a radiation detecting section that generates electric charges when irradiated with radiation which has passed through a subject, to record a radiation image of the subject;
   a readout section that reads out radiation image signals that represent the radiation image of the subject from the radiation detecting section;
   a confirmation image signal generating section, for generating confirmation image signals that represent a confirmation image having a lower resolution than the radiation image represented by the radiation image signals; and
   a wireless communicating section that outputs the radiation image signals and the confirmation image signals as wireless signals;
   the wireless communicating section decreasing the transfer rate of communications, without completely ceasing communications, during transmission of the confirmation image signals to be lower than the transfer rate of communications during transmission of the radiation image signals.

3. A radiation imaging apparatus as defined in claim 1, wherein:
   the confirmation image signal generating section generates confirmation image signals for only a portion of radiation image signals, in the case that a plurality of continuous imaging operations are performed.

4. A radiation imaging apparatus as defined in claim 2, wherein:
   the confirmation image signal generating section generates confirmation image signals for only a portion of radiation image signals, in the case that a plurality of continuous imaging operations are performed.

5. A radiation imaging system as defined in claim 1, wherein:
   in the case that a new imaging operation is initiated during transmission of the radiation image signals, the wireless communicating section ceases transmission of the radiation image signals until the new imaging operation is completed.

6. A radiation imaging system as defined in claim 2, wherein:
   in the case that a new imaging operation is initiated during transmission of the radiation image signals, the wireless communicating section ceases transmission of the radiation image signals until the new imaging operation is completed.

7. A radiation imaging system as defined in claim 3, wherein:
   in the case that a new imaging operation is initiated during transmission of the radiation image signals, the wireless communicating section ceases transmission of the radiation image signals until the new imaging operation is completed.

8. A radiation imaging system as defined in claim 4, wherein:
   in the case that a new imaging operation is initiated during transmission of the radiation image signals, the wireless communicating section ceases transmission of the radiation image signals until the new imaging operation is completed.

* * * * *